(12) United States Patent
Wong

(10) Patent No.: US 10,053,383 B2
(45) Date of Patent: Aug. 21, 2018

(54) BIOFERRIC-FLOCCULANT ENHANCED PRIMARY TREATMENT PROCESS (BEPT) FOR SEWAGE TREATMENT

(71) Applicant: Hong Kong Baptist University, Hong Kong (HK)

(72) Inventor: Jonathan Woon-Chung Wong, Hong Kong (HK)

(73) Assignee: Hong Kong Baptist University, Hong Kong (HK)

( * ) Notice: Subject to any disclaimer, the term of this patent is extended or adjusted under 35 U.S.C. 154(b) by 289 days.

(21) Appl. No.: 14/798,435

(22) Filed: Jul. 13, 2015

(65) Prior Publication Data

US 2016/0023933 A1    Jan. 28, 2016

Related U.S. Application Data

(60) Provisional application No. 62/028,332, filed on Jul. 24, 2014.

(51) Int. Cl.
| | | |
|---|---|---|
| *C02F 3/34* | (2006.01) | |
| *C02F 1/52* | (2006.01) | |
| *B01D 21/01* | (2006.01) | |
| *C02F 1/56* | (2006.01) | |

(52) U.S. Cl.
CPC ............ *C02F 3/341* (2013.01); *C02F 1/5263* (2013.01); *C02F 1/5245* (2013.01); *C02F 1/56* (2013.01); *C02F 3/346* (2013.01)

(58) Field of Classification Search
CPC .... C02F 1/56; C02F 3/34; C02F 3/341; C02F 1/52; C02F 1/5263; C12N 1/20
USPC .......................... 210/611, 730, 601
See application file for complete search history.

(56) References Cited

U.S. PATENT DOCUMENTS

| | | | |
|---|---|---|---|
| 5,454,948 A | 10/1995 | Tyagi et al. | |
| 5,720,887 A | 2/1998 | Vasconcellos et al. | |
| 6,039,875 A * | 3/2000 | Christiansen | C02F 1/56 |
| | | | 210/606 |
| 6,066,256 A | 5/2000 | Henry et al. | |
| 6,217,778 B1 | 4/2001 | Shing et al. | |
| 6,617,402 B2 | 9/2003 | Hernandez-Barajas et al. | |
| 6,660,163 B2 | 12/2003 | Miklos | |
| 2009/0325253 A1 | 12/2009 | Ascon et al. | |
| 2012/0241377 A1 * | 9/2012 | Ooi | C02F 1/441 |
| | | | 210/638 |

OTHER PUBLICATIONS

Zheng et al, "An Acid-Tolerant Heterotrophic Microorganisms Role in Improving Tannery Sludge Bioleaching Conducted in Successive Multibatch Reaction Systems," Environmental Science and Technology, vol. 43, No. 11, 2009, pp. 4151-4156.*

(Continued)

*Primary Examiner* — Claire A Norris

(74) *Attorney, Agent, or Firm* — Spruson & Ferguson (Hong Kong) Limited

(57) ABSTRACT

The present invention relates to one step "BioFerric flocculant enhanced primary treatment" (BEPT) process for domestic sewage treatment. More particularly, it relates to a novel composite flocculant consisting of acidophilic bacteria, and bacteriogenic flocculants for sewage flocculation and settling that enhanced the sewage treatment process by minimizing the chemical uses and steps and direct dewatering of sludge without preconditioning.

11 Claims, 4 Drawing Sheets

(56) References Cited

OTHER PUBLICATIONS

Yokoi et al, "Characteristics of a Biopolymer flocculant Produced by *Bacillus* sp. PY-90", Journal of Fermentation and Bioengineering, vol. 79, No. 4, 1995, pp. 378-380.*

Wong et al, "Bioleaching of heavy metals from anaerobically digested sewage sludge using FeS2 as an energy source", Chemosphere, vol. 55, 2004, pp. 101-107.*

Zhang et al, "Enhanced dewatering of waste sludge with microbial flocculant TJ-F1 as a novel conditioner", Water Research, vol. 44, 2010, pp. 3087-3092.*

Liu et al, "The co-culture of acidithiobacillus ferrooxidans and acidiphilium acidophilum enchanced the growth, iron oxidation, and CO2 fixation", Arch Microbiol, vol. 193, pp. 857-866 (Year: 2011).*

\* cited by examiner

BIOFERRIC-FLOCCULANT ENHANCED PRIMARY TREATMENT PROCESS (BEPT) FOR SEWAGE TREATMENT

CROSS REFERENCE

This application claims the benefit of U.S. 62/028,332 filed Jul. 24, 2014. The entire disclosure of the preceding application is hereby incorporated by reference into this application.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to one-step BioFerric flocculant enhanced primary treatment (BEPT) process for domestic sewage treatment. More particularly, it relates to a novel composite of BioFerric flocculant consisting of acidophilic bacteria, and bacteriogenic flocculants for sewage flocculation and settling that enhances the sewage treatment process by minimizing the chemical uses and steps, and performs direct dewatering of sludge without preconditioning.

BACKGROUND

Domestic sewage is generally treated by conventional activated sludge process and chemically enhanced primary treatment (CEPT) process. CEPT is an advanced primary treatment process in which inorganic coagulants and organic polymers are added to the sewage stream to enhance the settling of the suspended solids. The process typically includes coagulation of suspended solids by rapid mixing of ferric chloride or polyaluminum chloride followed flocculation of suspended solids, and then sedimentation of the flocs. Owing to the simple operation process and rapid treatment of large quantity sewage in short period of time, CEPT process has been implemented as an alternative treatment process to the conventional process. CEPT is believed to be a cost-effective method for sewage treatment as it has some advantages in sewage treatment, small investment and efficient removal of some pollutants such as phosphate, low energy requirement, and easy to operate and maintain rapid treatment of large quantity of wastewater. CEPT process is particularly very useful for rapidly growing mega cities and developing countries. One of the world's biggest CEPT plant is located at Stonecutter Island, Hong Kong, which is serving a population of around 3 millions and treatment capacity of 1.4 million $m^3$ sewage effluents per day.

Sewage is characterized by the presence of micro-colloidal or suspended particles with a certain amount of surface charge, which remain dispersed for a long time without sinking. However, reduction or elimination of the colloidal surface charge to achieve the critical potential decreases the electrostatic repulsion between small colloids generating particle coalescence, which ultimately results in destabilization and precipitation of colloids.

Chemical coagulants enhance the aggregation and adsorption of dissolved organic colloidal contaminants to form large aggregates, rapid-setting flocs either through charge neutralization or chain-bridging mechanisms which can then be removed by sedimentation and filtration. To enhance the removal efficiency of suspended particles, chemical coagulants such as alum, ferric chloride, ferric sulfate, and lime are usually used. Their major drawbacks are that the coagulant species form rapidly during dilution, and the formation of hydrolysis species cannot be controlled. In addition, CEPT process results in the increase in total dissolved solids (TDS) and production of excessive sludge volumes.

The major issue in sewage treatment is disposal of the large quantity of sludge that generated during sewage treatment process. CEPT process generates the sludge water content greater than 95%. Dewatering of the sludge is an essential that can be achieved by mechanical dewatering process through filter pressing or centrifugation after appropriate preconditioning of sludge. Due to the high strength of suspended particles with high negative charge, the CEPT sludge is difficult to dewater and it requires effective flocculants to improve the pre-dewatering flocculation of sludge flocs. The inorganic metal flocculants and organic polymers are generally used as pre-dewatering flocculants which are expensive. In sludge dewatering process, the typical doses of polyelectrolyte polymers between 1-10 kg per metric ton of dry sludge solids are used, and the polymers thus accounts for 0.1%-1% of the total solid mass of a conditioned sludge. Requirement of huge quantities of the expensive flocculants itself covers about 50% cost of the sludge treatment process.

Synthetic organic polymers and their derivatives pose a number of ecological hazards as some of the derivatives are recalcitrant and their intermediate products are hazardous to human health as their monomer is neurotoxic and carcinogenic. In CEPT process, the organic polymer flocculants are used in two different stages; anionic polymer for sewage flocculation and cationic polymer for sludge flocculation. Some cationic organic polymers used to enhance thickening and dehydration processes could result in strong odors due to their degradation during the storage of dewatered sludge. Therefore, in order to reduce the risks posed by these chemical coagulants, more environment-friendly and safe coagulants for pollutant removal in water treatment with more simplified process remain necessary to develop.

To alleviate concern over the use of synthetic flocculants, currently, microbial flocculants are drawing increasing attention due to their satisfied flocculating effectiveness and safe biodegradable nature. Their biodegradability, harmlessness and lack of secondary pollution, have gained much wider attention and research to date. Some of the microbial flocculants have advantages over other types of flocculants and can be produced economically in large scale. Several research works have provided a demonstration of microbial flocculants in removing suspended solids, chemical oxygen demand (COD), humic acids and heavy metals from several wastewaters, including domestic, brewage and pharmaceutical wastewaters. However, most of these bioflocculants reported to-date are polysaccharides based which are mainly involved in flocculation process via bridging mechanism only. On the other hand, the nature of BioFerric flocculant is a composite of inorganic and organic substances, which could facilitate both coagulation and flocculation of sewage suspended particles. In addition to removal of suspended solids, BioFerric flocculant also removes the nutrients from the sewage.

In view of above issues, there is an unmet need to have a novel BioFerric flocculant that could potentially replace the inorganic and synthetic polymeric flocculants, and reduce the number of steps in the conventional CEPT process and thus reduce the operation cost.

SUMMARY OF THE INVENTION

Accordingly, a first aspect of the presently claimed invention is to provide a BioFerric flocculant for sewage treatment.

According to an embodiment of the presently claimed invention, a BioFerric flocculant for sewage treatment comprises: a consortium comprising at least one species of iron-oxidizing bacteria; and at least one species of heterotrophic bacteria for producing polymeric substances.

A second aspect of the presently claimed invention is to provide a method for preparing a BioFerric flocculant for sewage treatment.

According to an embodiment of the presently claimed invention, a method for preparing a BioFerric flocculant for sewage treatment comprises: growing at least one species of iron-oxidizing bacteria, and at least one species of heterotrophic bacteria for producing polymeric substances in an aqueous buffered medium.

According to an embodiment of the presently claimed invention, a method for preparing a high-strength BioFerric flocculant for sewage treatment comprises: growing at least one species of acidophilic iron-oxidizing bacteria for generating biogenic iron (III) ions, and at least one species of acidophilic heterotrophic bacteria for producing polymeric substances in an acidic aqueous buffered medium containing at least one substrate having a concentration in a range of 44.22 g/L to 132.33 g/L.

A third aspect of the presently claimed invention is to provide a method for treating a sewage using BioFerric flocculant Enhanced Primary Treatment (BEPT).

According to an embodiment of the presently claimed invention, a method for treating a sewage using BioFerric flocculant Enhanced Primary Treatment comprises: mixing the BioFerric flocculant with the sewage to form suspended flocculated particles; settling the suspended flocculated particles to form at least one settled sludge; and direct dewatering the settled sludge.

The present invention provides one-step BioFerric flocculant enhanced primary treatment process for domestic sewage treatment. More particularly, it relates to a novel composite of BioFerric flocculant consisting of at least one acidophilic bacteria, and bacteriogenic flocculants for sewage flocculation and settling that enhances the sewage treatment process by minimizing the chemical uses and steps, and performs direct dewatering of sludge without preconditioning.

BRIEF DESCRIPTION OF THE DRAWINGS

Embodiments of the present invention are described in more detail hereinafter with reference to the drawings, in which.

DETAILED DESCRIPTION OF PREFERRED EMBODIMENTS

In the following description, BioFerric flocculants for sewage treatment, the corresponding embodiments of the fabrication methods, and the sewage treatment methods by using the BioFerric flocculants are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

The present invention focuses on the development of a novel BioFerric flocculant and process for sewage treatment as an alternative to existing conventional CEPT process.

Figure 1:
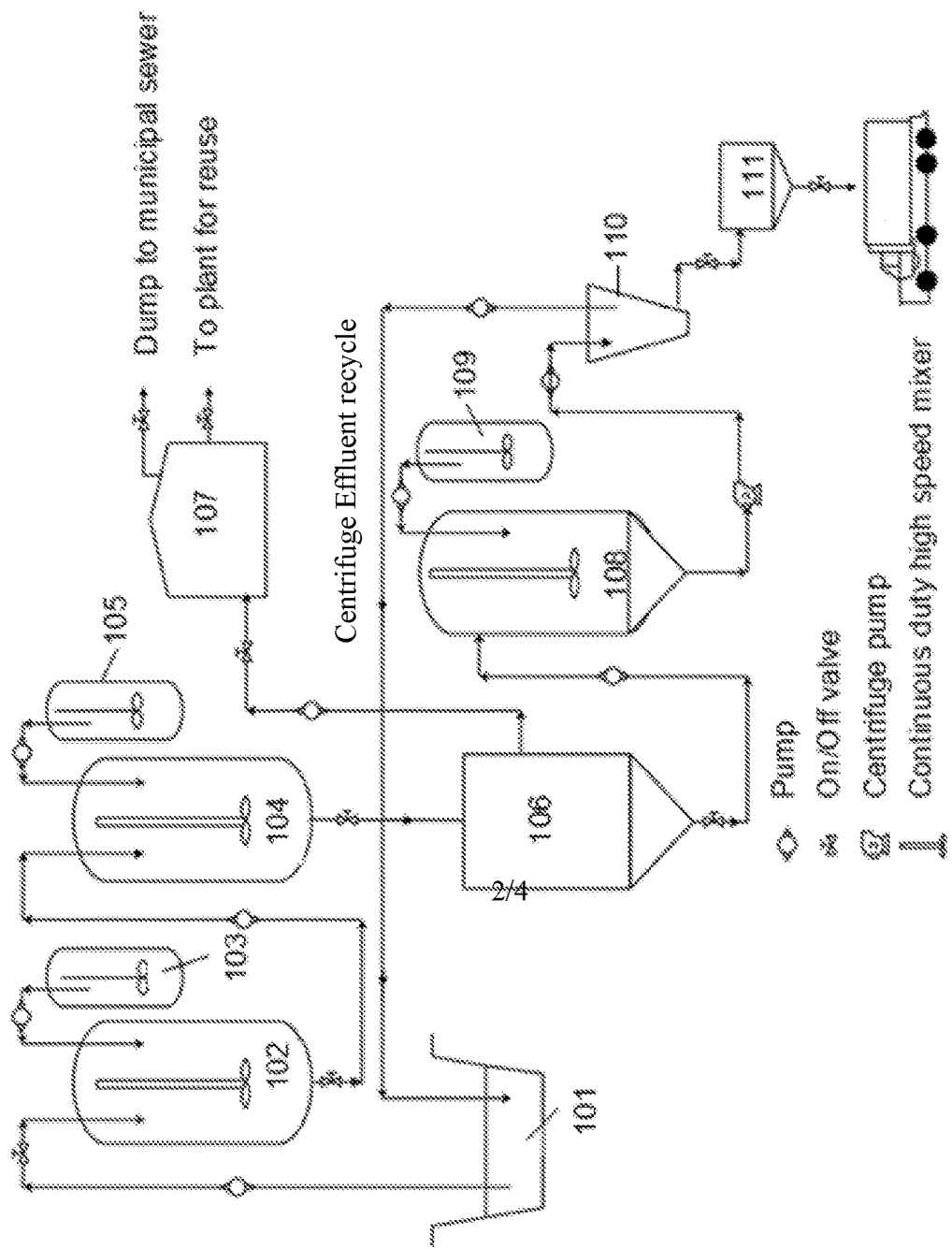
FIG. 1 shows a schematic diagram of a process flow of the conventional CEPT process in a prior art.

FIG. 1 shows a system for a conventional CEPT process comprising a sewage holding tank 101, a $FeCl_3$ mixing tank 102, a $FeCl_3$ storage tank 103, an anionic polymer mixing tank 104, an anionic polymer storage tank 105, a sedimentation tank 106, a clear effluent holding tank 107, a cationic polymer mixing tank 108, a cationic polymer storage tank 109, a centrifuge 110, and a dewatered sludge storage tank 111. At first, the raw sewage is chemically treated by ferric chloride and synthetic anionic polymer as shown in FIG. 1. Then, the settled sludge is conditioned with cationic polymer and dewatered (FIG. 1).

In order to replace the synthetic chemical flocculants and minimize the process steps, this invention aims at using the biologically produced flocculant that can supports both coagulation and flocculation activity with superior performance than the existing chemical flocculants. In this view, a biological source that can produce the flocculant to meet the objective is very important for this invention.

Acidophilic chemolithoautotrophic bacteria such as iron- and sulphur-oxidizing bacteria are known for bioleaching of metal ions from metal ores. A strain of *Acidithiobacillus ferrooxidans* ANYL-1 is an iron-oxidizing bacterium (IOB) isolated from sewage sludge which is very useful to remove the toxic metal from sewage sludge. This bacterium obtains energy for its growth by oxidizing iron (II) substrates and generate biogenic iron (III) ion during the growth which involves in metal leaching. An acidophilic heterotrophic bacterium, *Acidophilum* sp. BL1, is isolated from bioleached sewage sludge, which is able to grow together with IOB. For metal leaching from sludge, iron (II) substrate is added to the sludge to facilitate the growth of iron-oxidizing bacteria. However, this is a slow and time-consuming process to generate BioFerric flocculant. Therefore, the approach that directly cultivates these microorganisms in sewage or sewage sludge for dewatering is ineffective. To solve this problem, this invention discloses methods of production of BioFerric flocculant in optimized and controlled conditions and its application in sewage treatment.

In the present invention, a consortium of the acidophilic IOB and acidophilic heterotrophic bacterium is provided to produce an effective composite of BioFerric flocculant under optimized and controlled pH (2.0~3.0) and shaking (180 rpm) conditions. In addition to BioFerric flocculant, simultaneous production of biopolymer by the microbes would be of great advantages because the composite could perform dual functions. IOB and acidophilic heterotrophs can produce extracellular polymeric substances consisting of polysaccharides and proteins to facilitate adhesion of cells to the minerals and improve the bioleaching, and also to protect the cells from toxic effect of metals. IOB culture produces iron-rich flocculant, cell-bound and released extracellular polymeric substances, and secondary iron minerals. Because of the acidic nature (pH 2.0~2.2), high oxidation potential (>600 mV) and the presence of biogenic ferric along with biomacromolecular constants of bacterial cells, the BioFerric flocculant can act as a composite coagulant using both charge neutralization and bridging mechanism to achieve faster and maximum flocculation. Therefore, BioFerric flocculant developed from iron (II) substrate grown acidophilic IOB and acidophilic heterotrophic bacterium could be used as an alternative to the chemical synthetic flocculants.

Therefore, the present invention explores the potential of a composite of the BioFerric flocculant produced by acidophilic IOB and acidophilic heterotrophic bacterium in primary treatment of sewage and to compare its efficiency with commercial flocculants ($FeCl_3$ and anionic polymer) employed currently in CEPT process in Hong Kong. A comparative study is performed using the present BioFerric flocculant in the existing CEPT process at lab scale and using commercial flocculants to compare the existing treatment with the BioFerric flocculant-based treatment in order to monitor the extent of coagulation/flocculation. The effluent quality is determined by measuring the turbidity, total suspended and dissolved solids, chemical oxygen demand and total phosphorous content. The sludge generated after respective treatments are characterized by the dewaterability tests such as capillary suction time (CST) and specific resistance to filtration (SRF). This is the first to use the composite of BioFerric flocculant derived from IOB for primary treatment of domestic sewage.

Figure 2:
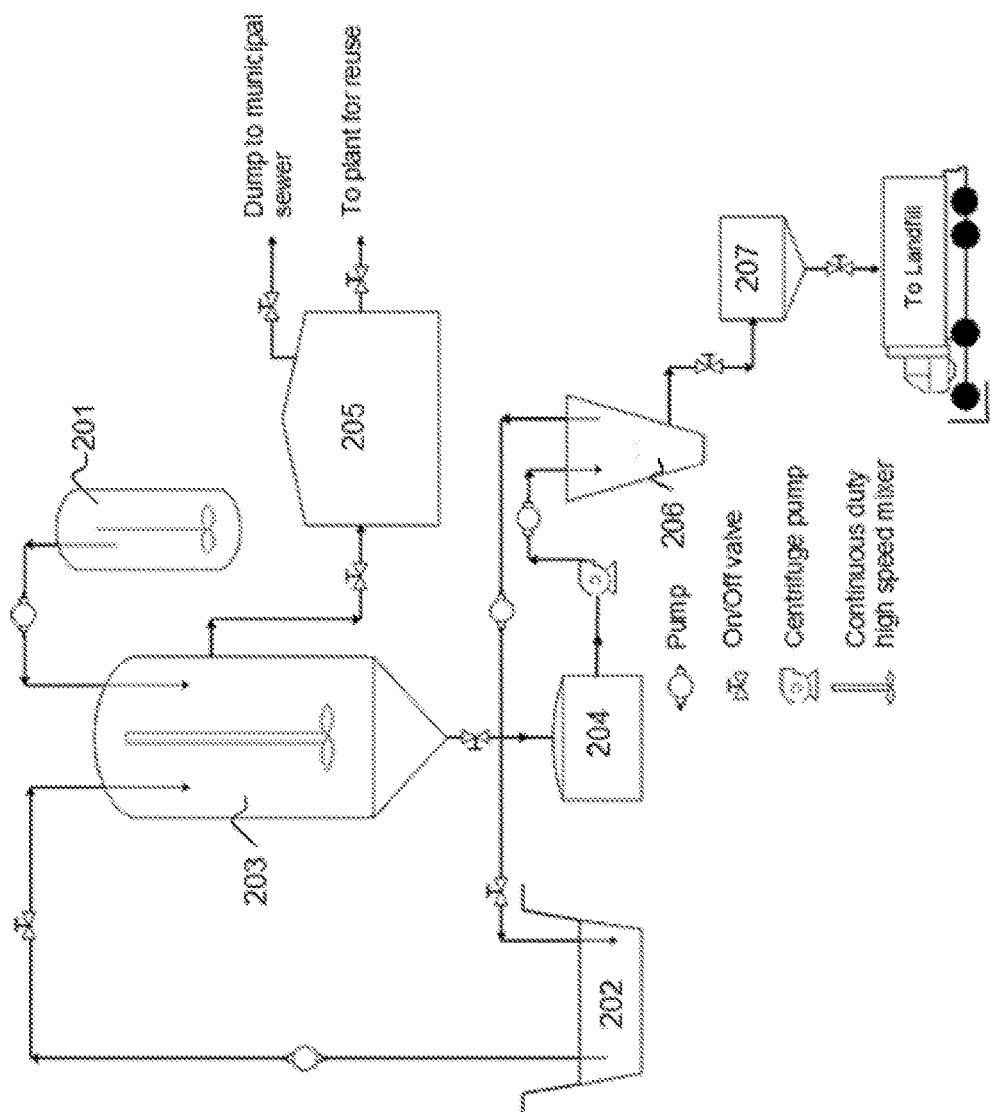
FIG. 2 shows a schematic diagram of a process flow of BEPT process for treatment of sewage according to an embodiment of the presently claimed invention.

The schematic diagram of process flow regarding this invention is shown in FIG. 2. The system for the BEPT process for treatment of sewage comprises a BioFerric flocculant production reactor 201, in which the BioFerric flocculant is produced; a sewage tank 202, a reaction tank 203 in which the sewage is treated using BioFerric flocculant, a primary sludge settling tank 204 in which the flocculated suspended particles are allowed to settle and from here settled sludge is send to the dewatering process, a clear effluent holding tank 205, a centrifuge 206 which separate the liquid and solid components of the sludge, and a dewatered sludge storage tank 207. There are no additional flocculation steps using anionic polymer and cationic polymer involved in BEPT process. Therefore, the overall BEPT process is simpler and shorter than the conventional CEPT process.

The present invention develops the BioFerric flocculant through biooxidation of iron (II) substrate by a unique combination of acidophilic consortium containing acidophilic IOB and heterotrophic bacteria. The BioFerric flocculant can be directly used for primary treatment of sewage, as an alternative to the chemically produced ferric chloride. The BioFerric flocculant-based treatment eliminates the existing requirement of anionic polymer as a flocculation aider for settling of suspended solid particles. This would effectively reduce the chemical cost as well as operation cost of the sewage treatment process in the conventional CEPT process. Quality of effluent from the BioFerric flocculant treated sewage is much better than that treated by the commercial process as the BioFerric flocculant removes dissolved solids as well as nutrients. The sludge settled in the BioFerric flocculant can be directly passed to mechanical dewatering without preconditioning. One important advantage of the BioFerric flocculant is its ability to reduce the sludge odor. Thus, this invention provides the BEPT process as a novel one-step process to replace the existing CEPT process and pre-dewatering sludge conditioning process. There have been no disadvantages yet identified with the present BioFerric flocculant in terms of its production and application.

Example 1: Sludge Collection and Characterization

The Municipal sewage sample is collected from the centralized sewage treatment works at the Stonecutters Island (SCISTW) in Hong Kong, Special Administrative Region, China, which serves a population of around 3 million and provides Chemically Enhanced Primary Treatment (CEPT) to 75% of the Harbor sewage effluents (1.4 million $m^3$ $d^{-1}$) by the addition of $FeCl_3$ and anionic polymer. The raw sewage sample is collected in clean 10 L polypropylene containers, which are stored at 4° C. for further use. The properties of raw sewage are pH 7.26; TSS 266±4 mg/L; TDS 11730±650 mg/L; OD 254 nm 0.318±0.004; COD 320±5.21 mg/L; phosphate 3.86±0.03 mg/L.

Example 2: Preparation of Composite BioFerric Flocculant

To prepare the BioFerric flocculant acidophilic microbial consortium consisting of iron-oxidizing bacteria *Acidithiobacillus ferrooxidans* ANYL1 and heterotrophic bacteria *Acidophilum* sp. BL1 are grown in an aqueous buffered medium with pH (2~3) consisting of 3.0 g of a substrate delivering nitrogen, 0.5 g/L of a substrate releasing potassium ion, 0.01 g of a substrate providing calcium ion, 0.5 g/L of a substrate consisting of magnesium, 22.11 to 44.22 g/L of a substrate releasing iron (II) ion, and with or without a substrate supporting carbons source. The specific consortium grown in this medium generates BioFerric flocculant in different range of conditions.

A five hundred milliliters (500 mL) flask contains 200 ml of said medium or sludge effluent with a substrate releasing iron (II) ion in the medium in a concentration from 4.42 to 8.84 g/L for growth of JOB. The flasks are inoculated with 5~10% bacterial seed culture and incubated at 180 rpm at a temperature ranging between 25 and 35° C. until the bacterial density reaches $1 \times 10^7$~$1 \times 10^8$ cells/mL and the culture becomes strongly acidic (pH 2.0~2.2) in 72 hours. The well-grown culture of this consortium produces the present BioFerric flocculant having flocculating activity. BioFerric flocculant is composed of divalent and trivalent iron flocculants, iron minerals, bacterial cells and bio-polymeric compounds. The composite of the present BioFerric flocculant is a versatile flocculant, which can perform multiple functions including, coagulation, flocculation, turbidity removal, nutrient removal, sludge settling and improving sludge dewaterability. The present BioFerric flocculant is used for sewage treatment without filtration or after fractionation into solids and filtrate.

Example 3: Coagulation and Flocculation of Sewage

Figure 3:
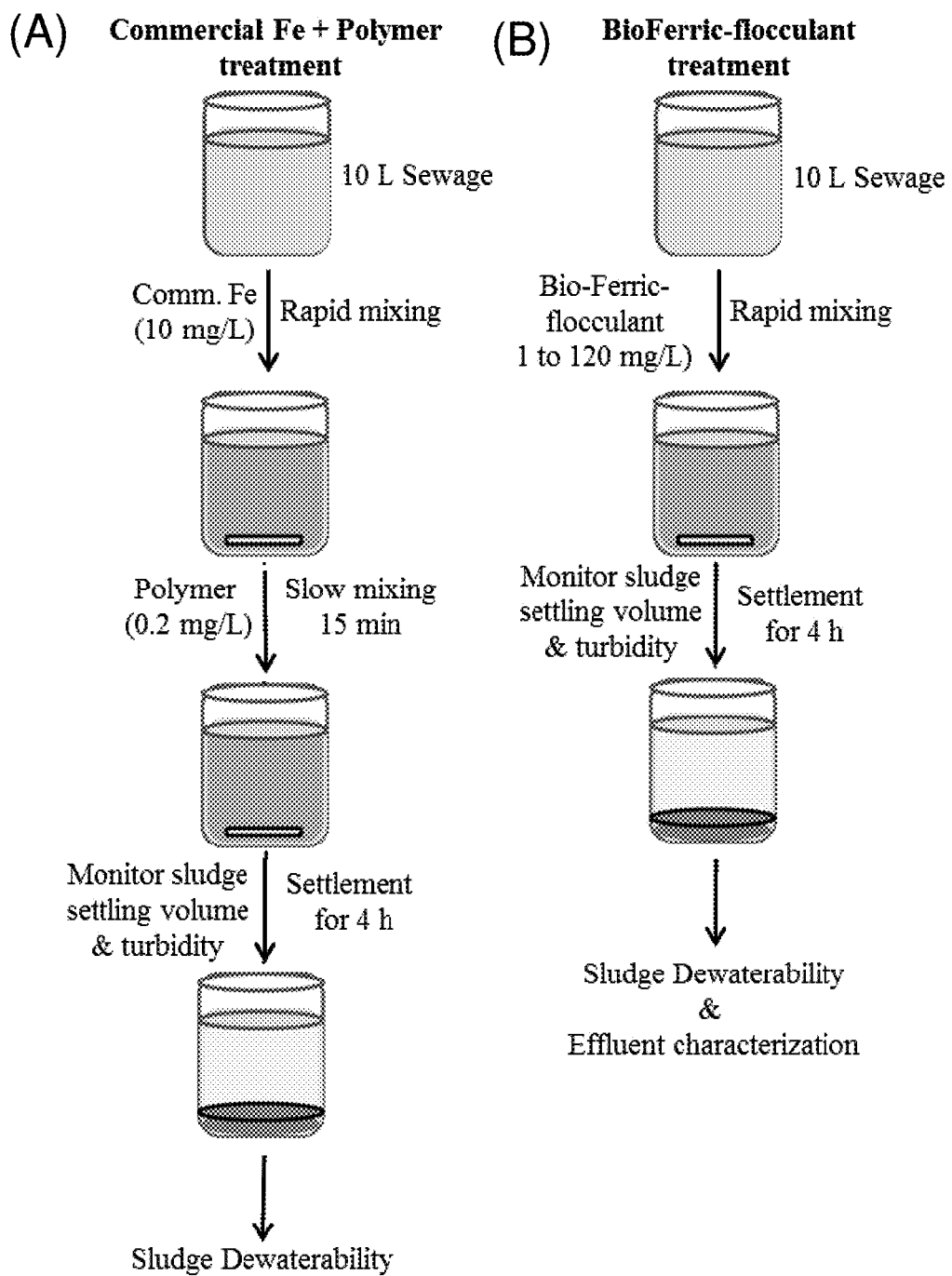
FIG. 3 shows a schematic diagram of an experimental flow for sewage coagulation and flocculation by CEPT in a prior art (A), and a schematic diagram of an experimental flow for sewage coagulation and flocculation by BEPT processes according to an embodiment of the presently claimed invention (B) respectively.

Sewage coagulation-flocculation experiments are performed in a polyethylene 15 L container at room temperature as shown in the process flows for CEPT and BEPT respectively (FIG. 3A-B). Raw sewage (10 L) is transferred into the container and subjected for rapid mixing initially at 150 rpm for 1 min. This is followed by addition of composite BioFerric flocculant delivering iron at different concentrations that varies between 1 and 120 mg/L. Then, the sewage is subjected to continuous stirring at 50 rpm for 15 minutes. After completion of mixing stage, the flocculated sewage is allowed to settle for 1~4 hours. Then, sample is collected at regular time intervals from the supernatant portion for pH, turbidity and nutrient analysis. After 4 hours of settlement, the supernatant (effluent) and settled sludge are separated from the container to analyze their properties and assess their dewaterability.

Example 4: Turbidity and pH Measurement

Turbidity is the primary visible problem in sewage wastewater. Therefore, the turbidity and pH of the BEPT and CEPT treated sewage are monitored at regular time intervals during sludge settling. Table 1 shows the turbidity of the sewage treated by CEPT and BEPT processes. As depicted in Table 1, within 30 minutes of settlement, commercial chemical treatment (Fe-polymer treatment) results in 63% reduction in turbidity; whereas the BEPT process achieves higher turbidity reduction than the CEPT process. A range of 50 to 95% turbidity reduction is observed as concentrations of BioFerric flocculant vary between 1 and 120 mg/L in the BEPT process. The BioFerric flocculant concentration between 30 and 60 mg/L shows maximum reduction in turbidity that is 95% within 30 minutes. After 4 hours, a maximum of 97% reduction in turbidity is observed when the sewage is treated with BioFerric flocculant, whereas chemical flocculants treatment could achieve 78% reduction.

Amongst all the concentrations of biogenic used, only 1~5 mg/L of BioFerric flocculant shows less turbidity removal (73%) as compared to commercial flocculant. Interestingly, after addition of BioFerric flocculant, the turbidity is suddenly increased during the mixing phase, as BioFerric flocculant may have formed the intense colloidal flocs of suspended and dissolved solids. But during the sedimentation period, the colloidal contaminants are destabilized by the BioFerric flocculant leading to its rapid precipitation. With higher concentrations of BioFerric flocculant (between 80 and 120 mg/L), the turbidity removal efficiency is observed to be less than that of BioFerric flocculant at a rate of 30~60 mg/L.

The initial pH of the sewage is around 7.2. Table 2 shows the changes in pH of sewage treated by CEPT and BEPT during 4 hours of settlement. As shown in Table 2, the pH change during commercial flocculant treatment is not much significant as the pH of control sewage. However, in case of the BEPT process, as the concentration of BioFerric flocculant increases, the pH drops during stirring phase and then remains almost constant while settling. When the BioFerric flocculant is in the range between 80 and 120 mg/L, the pH drops to 3.7. The higher concentration of the BioFerric flocculant facilitates acidification of sewage. Capture of $OH^-$ ions by $Fe^{3+}$ during hydrolysis lowers the pH and enables the formation of iron polymeric species that promote turbidity removal. As the BioFerric flocculant increases, the buffering capacity of the sewage is eventually exceeds, and then pH drops drastically provoking the formation of lesser non-hydrolyzed metal ions. This would decrease the aggregation of colloidal particles and hence, destabilization of the suspension could form. This invention finds that over 90% of the initial turbidity removal is achieved at BioFerric flocculant concentration between 10 and 60 mg/L and the residual turbidity of treated effluent using 120 mg/L is again found to be increased. Normally, for $Fe^{3+}$ based coagulants, the optimum pH range for coagulation falls in the pH range of 5-7 of adequate turbidity removal.

TABLE 1

Relative turbidity of the sewage (%)

| Time (h) | CEPT FeCl₃ + Polymer | Concentration of composite BioFerric flocculant (mg/L) | | | | | |
|---|---|---|---|---|---|---|---|
| | | 1~5 | 5~10 | 10~15 | 20~30 | 30~60 | 80~120 |
| −0.5 | 100 ± 0 | 100 ± 0 | 100 ± 0 | 100 ± 0 | 100 ± 0 | 100 ± 0 | 100 ± 0 |
| 0 | 84 ± 4.88 | 118 ± 0.54 | 121 ± 6.82 | 121 ± 5.71 | 154 ± 15.15 | 183 ± 21.4 | 287 ± 9.57 |
| 0.25 | 48 ± 3.66 | 60 ± 0.28 | 44 ± 0.71 | 21 ± 0.55 | 15 ± 6.6 | 5.08 ± 2.11 | 15 ± 0.20 |
| 0.5 | 37 ± 0.63 | 50 ± 0.63 | 33 ± 0.86 | 16 ± 1.14 | 12 ± 6.59 | 4.63 ± 2.18 | 13 ± 0.25 |
| 1 | 31 ± 1.61 | 36 ± 1.04 | 23 ± 0.84 | 14 ± 1.91 | 10 ± 7.23 | 4.38 ± 1.97 | 12 ± 0.05 |
| 2 | 28 ± 0.32 | 32 ± 0.18 | 18 ± 0.75 | 10 ± 3.16 | 8 ± 6.23 | 3.42 ± 1.3 | 9 ± 2.28 |
| 4 | 22 ± 0.16 | 27 ± 0.12 | 15 ± 0.17 | 7 ± 2.22 | 6 ± 4.58 | 3.12 ± 1.26 | 7 ± 1.91 |

TABLE 2

| Time (h) | CEPT FeCl₃ + Polymer | Concentration of BioFerric flocculant (mg/L) | | | | | |
|---|---|---|---|---|---|---|---|
| | | 1~5 | 5~10 | 10~15 | 20~30 | 30~60 | 80~120 |
| −0.5 | 7.26 | 7.29 | 7.27 | 7.11 | 7.16 | 7.27 | 7.25 |
| 0 | 7.18 | 7.19 | 7.14 | 6.92 | 6.8 | 6.5 | 3.7 |
| 0.25 | 7.18 | 7.2 | 7.15 | 6.96 | 6.82 | 6.52 | 3.68 |
| 0.5 | 7.19 | 7.22 | 7.16 | 7.02 | 6.92 | 6.51 | 3.66 |
| 1 | 7.14 | 7.23 | 7.14 | 6.96 | 6.88 | 6.42 | 3.68 |
| 2 | 7.09 | 7.15 | 7.09 | 6.95 | 6.82 | 6.37 | 3.7 |
| 4 | 7.07 | 7.16 | 7.07 | 6.69 | 6.58 | 6.18 | 3.68 |

Example 5: Removal of Suspended and Dissolved Solids

Suspended solids and dissolved solids are the important characteristics of sewage. The main aim of the sewage treatment is the removal of suspended solids and nutrients from sewage. The volume of sludge produced in a sewage treatment process is directly related to the total suspended solids present in the sewage. Removal of suspended solids determines the efficiency of the treatment process. After 4 hours settling period, the effluent and settled sludge are separated and analyzed for effluent properties. Table 3 shows the removal of TSS and TDS from control sewage and sewage treated with CEPT and BEPT processes after 4 hours settling period. As shown in Table 3, the total suspended solids (TSS) and total dissolved solids (TDS) values are much higher in untreated control sewage. Whereas, TSS and TDS values are found to be decreased when treated with commercial flocculants as well as BioFerric Flocculants. The TSS is reduced by 60% after treatment with commercial flocculants. In BioFerric Flocculant treated case, due to rapid coagulation and flocculation, the TSS is decreased by 59 to 80% with ranges between 1 and 120 mg/L of BioFerric Flocculant. The effluent quality is much more improved after treatment with BioFerric Flocculant, as it could coagulate and remove the dissolved matter in the sludge form. The reduction in turbidity, TSS and TDS can be inter-correlated. The reduction in turbidity is directly proportional to the reduction in TSS and TDS. As shown in Table 1 and Table 3, the turbidity, TSS and TDS of effluent decrease as the concentrations of BioFerric Flocculant increased. TDS is also found to decrease after both treatments, but in TDS removal case also, BioFerric Flocculant is found to be superior flocculant over commercial flocculants; however, significant reduction in TDS is achieved at BioFerric Flocculant concentrations between 60 and 120 mg/L. The chemical flocculants used for TSS removal can increase the TDS due to precipitation of salts and cannot take active participation in reducing dissolved solids.

TABLE 3

| Treatments | | TSS (mg/L) | TDS (mg/L) |
|---|---|---|---|
| Control | | 266 ± 4 | 11730 ± 65 |
| CEPT (FeCl$_3$ + Polymer) | | 106.5 ± 2 | 11637 ± 42 |
| BioFerric Flocculant (mg/L) | 1~5 | 108.5 ± 4.5 | 11730 ± 36 |
| | 5~10 | 96 ± 6 | 11595 ± 10 |
| | 10~15 | 87.25 ± 2.8 | 11206 ± 11 |
| | 15~30 | 60.25 ± 7.8 | 11158 ± 39 |
| | 30~60 | 55 ± 4.5 | 10644 ± 38 |
| | 80~120 | 52.25 ± 1.3 | 10367 ± 81 |

The sludge settlement is found to be much more enhanced after the addition of commercial or BioFerric flocculant as compared to the control. As the settlement rate is much higher, a short period (1 to 4 hours) is sufficient for the settlement of aggregates in BioFerric flocculant treatment.

Example 6: Aromatic Organics, COD and Odor Reduction by BioFerric Flocculant

One of the most problematic types of organics is aromatic organics. The double bond ring structure of aromatic molecules results in free electrons causing aromatic organics to generally be more reactive than other organics. Aromatic organics are best detected using the UV 254 nm wavelength because of the strong absorption properties. Therefore, the greater the absorption of UV light at a wavelength of 254 nm, the effluent contains higher amount of aromatic organics. Table 4 shows the removal of organics, COD and odor from control sewage and sewage treated with CEPT and BEPT processes after 4 hours settling period. From Table 4, it is clear that, untreated sewage effluent has higher amount of aromatic organics. The treatment of chemical flocculants poorly removes these organics, whereas the BioFerric flocculant eliminates these aromatic organics in a significant level. This is attributed to the reduced TDS in biogenic treatment. The COD removal ability of commercial flocculants is unsatisfactory as it could reduce the COD by 43% as compared to the control, while BioFerric flocculant could attain a maximum of COD reduction between 40 and 63.4% reduction in COD (Table 4). The higher level of COD removal is attributed to the strong oxidizing potential of BioFerric flocculant.

TABLE 4

| Treatments | | OD (254 nm) | COD (mg/L) | Odor (D/T value) |
|---|---|---|---|---|
| Control | | 0.318 ± 0.004 | 320 ± 5.21 | <30 |
| Commercial FeCl$_3$ + Polymer | | 0.313 ± 0.008 | 181 ± 5.33 | <15 |
| BioFerric Flocculant (mg/L) | 1~5 | 0.305 ± 0.008 | 192 ± 4.73 | >15 |
| | 5~10 | 0.297 ± 0.008 | 160 ± 0.0 | >7 |
| | 10~15 | 0.289 ± 0.002 | 152 ± 4.62 | >7 |
| | 15~30 | 0.284 ± 0.004 | 144 ± 0.0 | >7 |
| | 30~60 | 0.283 ± 0.002 | 136 ± 4.62 | >7 |
| | 80~120 | 0.283 ± 0.004 | 117 ± 4.73 | >7 |

Gaseous wastes, leading to air pollution in the form of odors, can have the greatest impact on the population in the vicinity of the sewage treatment works. The odors emanating from a sewage treatment works are generally associated with biological decay of organic material and it is caused by highly degradable or warm effluents, or effluents with high-sulfur content. In general, hydrogen sulfide (H$_2$S) is the predominant odorant associated with sewage. In this investigation, it is observed that the strong unpleasant odor of control sewage is diminished after its treatment with Bio-Ferric flocculant even at low concentration; whereas, the odor reduction is poor in chemical flocculants treated sludge. On the other hand, the odor removal ability of BioFerric flocculant is much enhanced as confirmed by the field olfactometer instrument (Nasal Ranger). The commercial flocculant used in this study has the combination of FeCl$_3$ and anionic polymer. Some of the commercial polymers used in water treatment cause some severe odor problems. Probably, due to the presence of polymer in conventional process, the effluent and sludge odor could not reduce as BioFerric flocculant does.

Example 7: Removal of Phosphate

Phosphorus in sewage is usually present in the form of organic compounds and phosphates. Phosphorous being a major cause of eutrophication in water streams, which should not underestimated. Phosphorus can easily be removed by chemical precipitation. Iron salts in chemical flocculants strongly interact with phosphate and precipitate it. Table 5 shows the removal of phosphate from sewage treated with CEPT and BEPT processes. In particular set of experiment, it is observed that, commercial flocculant could reduce total phosphorous up to 30% (Table 5), whereas the BioFerric flocculant shows enhanced phosphorous removal. A maximum of 98% phosphorous removal is achieved in BEBT process. The phosphorous removing ability of Bio-Ferric flocculant is found to be much higher over a range of concentrations (Table 5).

TABLE 5

| Treatments | | Total PO$_4$ (mg/L) |
|---|---|---|
| Control sludge | | 3.86 ± 0.03 |
| CEPT (FeCl$_3$ + Polymer) | | 2.70 ± 0.03 |
| BioFerric Flocculant (mg/L) | 5~10 | 2.137 ± 0.03 |
|  | 10~15 | 1.691 ± 0.27 |
|  | 15~30 | 0.121 ± 0.01 |
|  | 30~60 | 0.083 ± 0.01 |
|  | 80~120 | 0.094 ± 0.01 |

Example 8: Sludge Properties and Dewaterability

Flocculated suspended solids are settled in the form of sludge. Table 6 shows the properties of sludge obtained from CEPT and BEPT processes after 4 hours settlement. The characteristics of the sludge settled after 4 hours settling of treated sewage are depicted in Table 6. The initial pH of the sludge collected from the control and commercial flocculant treated sludge is close to neutral; while the BioFerric flocculant treated sludge had acidic pH. A drop in pH is observed when the concentration of BioFerric flocculant is increased. The lowest level of pH 3.42 is noted for the sludge generated after the sewage treatment with BioFerric flocculant at a concentration between 1 and 120 mg/L. The ORP of the control and commercial flocculant treated sewage sludge is highly negative stating the reductive conditions of the sludge and dewatering would be difficult without further conditioning. The BioFerric flocculant, being highly oxidative in nature, significantly minimizes the reductive conditions of the sludge, showing high ORP values. The sludge with high ORP level can be easily dewatered. In case of the BioFerric flocculant treated sewage; the sludge is highly oxidative due to intensive digestion. Similar to the sewage effluent, the sludge obtained after the commercial flocculants treatment contains very strong and unpleasant odor; whereas, the BioFerric flocculant reduces the sludge odor effectively. The sludge collected after BioFerric flocculant treatment is characterized by dark brown color whereas the commercial flocculant treatment results in dark black colored sludge as seen in FIG. 4A-B respectively, indicating that the sludge is in highly reductive conditions.

TABLE 6

| Parameters | Control | BioFerric Flocculant | CEPT FeCl$_3$ + polymer |
|---|---|---|---|
| Sludge volume (ml) | ~80 ± 4.0 | ~150 ± 10.0 | ~150 ± 10.0 |
| TS (%) | 1.9 ± 0.03 | 2.53 ± 0.05 | 2.52 ± 0.07 |
| pH | 7.12 ± 0.08 | 6.78 ± 0.01 | 7.00 ± 0.075 |
| ORP (mV) | −150 ± 12.6 | −81 ± 3.2 | −189 ± 8.5 |
| Odor | >30 | >7 | >15 |

Figure 4:
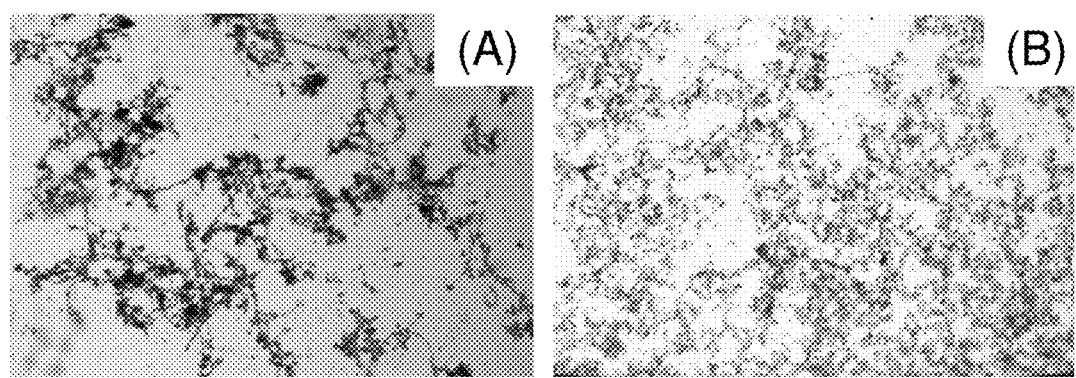
FIG. 4 shows morphology of the sludge flocs collected after sewage treatment using CEPT process (A), and BEPT process (B) respectively according to an embodiment of the presently claimed invention.

The light microscopic structure of sludge flocs obtained from the sludge settled after 4 hours of treatment of commercial flocculant and BioFerric flocculant concentration are illustrated in the FIG. 4A-B respectively. In both the treatments, the contacts between individual particles are much closer and boundaries are well defined and flocs are having firm structure. The polymer treated sludge shows the bigger sized flocs formation with some inconsistency in floc size, while in case of biogenic treatment; the flocs formed have much consistent in size. In addition, BioFerric flocculant treated sewage sludge seems to be much digested which caused the maximum release of bound water molecules to it. There is not much significant difference in the flocs obtained with other concentrations of BioFerric flocculant used.

Example 9: Dewaterability of Sludge Obtained from CEPT and BEPT Process

Sludge dewatering is the biggest challenge in sewage treatment process. The sludge flocs holds bound water and intrinsic water. As BioFerric flocculant could improve the removal of suspended and dissolved solids in sewage, the volume of sludge obtained after biological treatment is increased as compared to commercial flocculant treatment. As compared to control, there is significant increase in total solids content by 32 and 30~36% for chemical flocculants and BioFerric flocculants treatment, respectively. As concentration of BioFerric flocculant is increased, the solids content of the sludge is also increased. This indicates that increased amount of solids are removed by BioFerric flocculant. One of the advantages of BEPT process as the sludge with higher solids content can be dewatered much effectively.

The dewaterability of the sludge samples obtained from BioFerric and chemical flocculants treated sewage is directly assessed without any preconditioning using the standard laboratory dewaterability parameters such as CST and SRF. Table 7 shows the CST and SRF of sludge collected from CEPT and BEPT process. The CST of the collected sludge from CEPT process is 54 s (Table 7), whereas, the CST of sludge obtained from biogenic treatment is ranged from 33 s to 13.4 s (1 to 120 mg/L). This CST is improved by 39 to 75%. The BioFerric flocculant enhanced the rapid release of bound water molecules from sludge flocs during sewage treatment which ultimately caused rapid reduction in CST. It is assumed that, the sludge having the CST value less than 20 s can be easily dewatered. In other words, the CST is dropped with the increase in versatile flocculation efficiency of BioFerric flocculant. Similar to CST, the SRF of sludge obtained after chemical flocculant treatment is high ($3.25 \times 10^{14}$) as compared to the BioFerric flocculant treated sewage ($2.93 \times 10^{14}$ to $7.89 \times 10^{13}$). This invention confirmed that BioFerric flocculant can provide better dewaterability of primary sludge without adding further sludge conditioning using cationic polymer as like conventional process. This clearly indicates that BioFerric flocculant developed in this invention is an efficient flocculant for sewage settling and the resultant sludge can be directly subjected to mechanical dewatering. This approach can save the process steps and chemicals required for dewatering.

TABLE 7

| Parameters | | CST (s) | SRF (m/kg) |
|---|---|---|---|
| CEPT (FeCl$_3$ + Polymer) | | 54 ± 2.15 | $3.25 \times 10^{14} \pm 4.22 \times 10^{13}$ |
| BioFerric Flocculant (mg/L) | 1~5 | 33.4 ± 1.55 | $2.93 \times 10^{14} \pm 2.93 \times 10^{13}$ |
|  | 5~10 | 21.7 ± 2.25 | $1.17 \times 10^{14} \pm 1.53 \times 10^{13}$ |
|  | 10~15 | 19.2 ± 1.55 | $9.70 \times 10^{13} \pm 1.55 \times 10^{13}$ |
|  | 15~30 | 17.4 ± 2.25 | $9.40 \times 10^{13} \pm 1.13 \times 10^{13}$ |
|  | 30~60 | 14.3 ± 1.95 | $8.46 \times 10^{13} \pm 1.18 \times 10^{13}$ |
|  | 80~120 | 13.4 ± 0.4 | $7.58 \times 10^{13} \pm 9.85 \times 10^{12}$ |

BEPT process is much more effective than chemical flocculants as it could settle the sludge rapidly and leaving clear effluent. The major constituents responsible for rapid and maximum flocculation of colloidal contaminants are the composite nature of BioFerric flocculant produced by the disclosed acidophilic microbial consortium. The contents of BioFerric-flocculant is responsible for destabilization and settling of negatively charged colloidal s via multiple mechanisms such as charge neutralization and particle-particle bridging mechanism.

Example 10: Dewaterability of Sludge Obtained from CEPT and BEPT Process

In Example 3, the BioFerric flocculant is employed in the aqueous form. The aqueous BioFerric flocculant may lose its active contents during long-term storage due to formation of precipitate. The condensation and solidified BioFerric could be easier for storing and transporting from the production point to the wastewater treatment plant. This example evaluates the concentration of the aqueous BioFerric flocculant and its feasibility in sewage treatment. To achieve this, the aqueous BioFerric flocculant is concentrated using freeze dryer until the removal of water content. The concentration results in dry powder form product. The powder form of BioFerric flocculant is mixed with raw sewage at different iron concentrations ranging from 5 to 60 mg/L. Then, the sewage is treated as disclosed in Example 3 and FIG. 3B.

Table 8 shows the properties of sewage treated with BEPT process using solid BioFerric-flocculant and the dewaterability of derived sludge. It can been seen from Table 8 that the solid form of BioFerric flocculant also shows an effective removal of the suspended solid particles as similar to that of the liquid form of BioFerric flocculant. In addition, it also removes the dissolved solids slightly. Effective removal of suspended solid particles results in significant reduction of effluent turbidity after 4 hours settling period. COD of the BioFerric flocculant treated sewage is also decreased about 56.8% compared to the control. The overall performance of solid BioFerric flocculant is higher than the $FeCl_3$ mediated flocculant in the CEPT process as disclosed in the previous examples. Due to the effective removal and settling of the suspended solids, the resultant sludge has high solid content than the untreated Importantly, dewaterability parameter indicates that the CST value is 22 s, which is significantly differed from the sludge of untreated sewage, and the value is close to optimum CST value required for sludge dewaterability. Therefore, the sludge settled in BEPT process does not require the additional conditioning, and the settled sludge is directly dewatered through filtration.

TABLE 8

| Parameters | Control | BEPT |
|---|---|---|
| Turbidity (NTU) | 144.5 ± 7.77 | 8.75 ± 1.48 |
| pH | 7.12 | 7.15 |
| TSS (mg/L) | 282.5 ± 10.6 | 88 ± 4.24 |
| TDS (mg/L) | 11.766 ± 76.3 | 11,226 ± 83.43 |
| COD (mg/L) | 315 ± 21.2 | 136 ± 11.31 |
| TS (%) | 1.8 ± 0.06 | 2.38 ± 0.05 |
| CST (s) | 68 ± 2.8 | 22.01 ± 0.35 |

Example 11: High Strength BioFerric Flocculant

In real scale sewage and sludge treatment, large volume of the BioFerric flocculant is needed. The volume of BioFerric flocculant to be applied for sewage or sludge treatment can be reduced by producing high concentration BioFerric flocculant. High concentration BioFerric flocculant is produced by the cultivating the microbes used in the Example 2 and altering the media composition with flocculant producing substrate used in Example 2 at various concentrations (g/L) ranging from 1× to 3× of that used in Example 2. The microbes are able to grow at higher concentrations of flocculant producing substrate and produce concentrated composite BioFerric flocculant within 72-96 h. The required volume of BioFerric flocculant derived from 1.5× and 3× media for effective sludge dewatering lowered about 1.5 to 3 times as compared to that of 1× as presented in Table 9. This would reduce the volume BioFerric flocculant to be applied in field scale.

TABLE 9

High concentration BioFerric flocculant and sludge dewaterability

| BioFerric flocculant from 1x, 1.5x and 3x medium | Vol. of BioFerric flocculant required (mL) | CEPT sludge CST (s) |
|---|---|---|
| 0x | 0 | 366.7 ± 6.3 |
| 1x | 3.96 | 75 ± 3.6 |
| 1.5x | 2.80 | 69 ± 4.2 |
| 3.0x | 1.35 | 65.6 ± 7.7 |

According to an embodiment of the presently claimed invention, a method for preparing BioFerric flocculant for CEPT process comprises: the use of at least one *Acidithiobacillus ferrooxidans* and at least one species of heterotrophic bacterium which are grown in an aqueous buffered medium; and the use of a specific consortium further comprising acidophilic iron-oxidizing bacterium and heterotrophic bacteria which generates BioFerric flocculant in different range of conditions.

Preferably, the at least one species of *Acidithiobacillus ferrooxidans* comprises *Acidithiobacillus ferrooxidans* ANYL-1. The at least one species of heterotrophic bacterium comprises *Acidophilum* sp. BL-1. The aqueous buffered medium comprises a substrate delivering nitrogen, a substrate releasing potassium ion, a substrate providing calcium ion, a substrate consisting of magnesium, a substrate releasing iron (II) ion, and with or without a substrate supporting carbons source. The substrates have a concentration in a range of 44.22 g/L to 132.33 g/L for producing a high-strength BioFerric flocculant, and the substrate is preferably for releasing iron ion.

Preferably, the BioFerric flocculant comprises bacterial cells, acidic soluble ferric ions, polymeric ferric, organic substances, and iron minerals in solid forms to form a composite BioFerric flocculant. The BioFerric flocculant is in the form as a whole culture containing both liquid and solid phase or as a filtrate for sewage treatment.

According to an embodiment of the presently claimed invention, a method for treating domestic sewage using BioFerric flocculant Enhanced Primary Treatment (BEPT) in which a composite BioFerric flocculant is used separately to treat the primary sludge, comprises: a) mixing of the BioFerric flocculant with raw sewage; b) settling of suspended flocculated particles; and c) direct dewatering of settled sludge without preconditioning.

Preferably, the composite of BioFerric flocculant is used at proportions to give iron concentrations in ranges between 1 and 120 mg/L, and the settling of suspended solids, effluent and sludge dewatering properties are assessed, and the dewaterability proportion of sludge is determined through a mechanical dewatering process. The sludge required no preconditioning and is directly dewatered by mechanical filtration without additional flocculants. The BioFerric flocculant in solid form is used.

According to an embodiment of the presently claimed invention, a CEPT process for sewage treatment wherein the chemical flocculant FeCl₃ is replaced with the composite BioFerric flocculant. The addition anionic polymer aiding flocculation process in the CEPT process is eliminated.

INDUSTRIAL APPLICABILITY

The present invention discloses approaches solving the issues related to the wastewater treatment facilities and pertained to the development of a potential strategy for rapid flocculation, filterability and dewaterability of sewage sludge. More particularly, it relates to a novel composite biogenic flocculant consisting of a blend of different microbial consortia exhibiting multifunctional process that potentially enhanced the sludge dewaterability.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for treating a sewage using BioFerric flocculant Enhanced Primary Treatment (BEPT) comprising:
   mixing a BioFerric flocculant of with the sewage to form suspended flocculated particles, wherein the BioFerric flocculant comprises:
   biogenic iron (III) ions produced from at least one species of acidophilic iron-oxidizing bacteria; and
   polymeric substances produced from at least one species of acidophilic heterotrophic bacteria, wherein the at least one species of acidophilic iron-oxidizing bacteria and the at least one species of acidophilic heterotrophic bacteria are co-cultured at a pH of 2 to 3, and wherein the concentration of the BioFerric flocculant ranges between 30 and 60 mg/L in the sewage.

2. The method of claim 1, further comprising:
   settling the suspended flocculated particles to form a settled sludge; and dewatering the settled sludge.

3. The method of claim 1, wherein the BioFerric flocculant is in solid form.

4. The method of claim 1, wherein the BioFerric flocculant further comprises an aqueous buffered medium with pH of 2 to 3.

5. The method of claim 1, wherein the at least one species of acidophilic iron-oxidizing bacteria comprises Acidithiobacillus *ferrooxidans* ANYL1, and the at least one species of acidophilic heterotrophic bacteria comprises *Acidophilum* sp. BL1.

6. The method of claim 1, wherein the BioFerric flocculant is a whole culture comprising at least one of a liquid phase and a solid phase.

7. The method of claim 1, wherein the BioFerric flocculant is produced from a bacterial cell culture with a density of the acidophilic iron-oxidizing bacteria and the acidophilic heterotrophic bacteria of between $1\times10^7$ and $1\times10^8$ cells/mL.

8. The method of claim 4 further comprising the steps of:
   providing the at least one species of acidophilic iron-oxidizing bacteria for generating biogenic iron (III) ions and the at least one species of acidophilic heterotrophic bacteria for producing polymeric substances in the acidic aqueous buffered medium at a pH of 2 to 3;
   growing the at least one species of acidophilic iron-oxidizing bacteria and at least one species of acidophilic heterotrophic bacteria thereby producing an acidic aqueous buffered medium comprising biogenic iron (III) ions and polymeric substances;
   collecting the acidic aqueous buffered medium comprising biogenic iron (III) ions and polymeric substances; and
   optionally removing water from the acidic aqueous buffered medium comprising biogenic iron (III) ions and polymeric substances thereby producing the BioFerric flocculant.

9. The method of claim 8, wherein the acidic aqueous buffered medium further comprises a substrate releasing iron (II) ion for facilitating growth of the acidophilic iron-oxidizing bacteria.

10. The method of claim 8, wherein the acidic aqueous buffered medium further comprises one or more substrates selected from the group consisting of delivering nitrogen, a substrate releasing potassium ion, a substrate providing calcium ion, a substrate consisting of magnesium, and a substrate releasing iron (II) ion.

11. The method of claim 8, wherein the step of growing the acidophilic iron-oxidizing bacteria and the acidophilic heterotrophic bacteria in the acidic aqueous buffered medium further comprises: incubating the acidophilic iron-oxidizing bacteria and the acidophilic heterotrophic bacteria under shaking conditions at a temperature ranging from 25 to 35° C.

* * * * *